United States Patent [19]

Schneider

[11] Patent Number: 5,554,994
[45] Date of Patent: Sep. 10, 1996

[54] SELF-SURVEYING RELATIVE GPS (GLOBAL POSITIONING SYSTEM) WEAPON GUIDANCE SYSTEM

[75] Inventor: Arthur J. Schneider, Tucson, Ariz.

[73] Assignee: Hughes Missile Systems Company, Los Angeles, Calif.

[21] Appl. No.: 461,080

[22] Filed: Jun. 5, 1995

[51] Int. Cl.$^6$ ............................. H04B 7/185; G01S 5/02
[52] U.S. Cl. ................................. 342/357; 244/3.19
[58] Field of Search ........................... 342/357; 244/3.19

[56] References Cited

U.S. PATENT DOCUMENTS

| | | | |
|---|---|---|---|
| 5,260,709 | 11/1993 | Nowakowski | 342/62 |
| 5,344,105 | 9/1994 | Youhanaie | 244/3.14 |
| 5,361,212 | 11/1994 | Class et al. | 364/428 |
| 5,477,458 | 12/1995 | Loomis | 364/449 |

*Primary Examiner*—Theodore M. Blum
*Attorney, Agent, or Firm*—Charles D. Brown; Wanda K. Denson-Low

[57] ABSTRACT

Disclosed is a self-surveying relative GPS (Global Positioning System) weapon guidance system (10). This guidance system (10) includes multiple GPS satellites (12–18) which transmit GPS data to a ground sensor (20). The ground sensor (20) includes a GPS receiver (24), a self-surveying computer (28), a data formatter (30) and a transmitter (32). The GPS receiver (24) receives the GPS data and determines a second location of the ground sensor (20) based on the GPS data. The self-surveying computer (28) determines a first location of the ground sensor (20) based on the GPS data gathered over time, which is more accurate than the second location. The data formatter (30) determines a GPS error between the first and second locations which is transmitted by the transmitter (32). The GPS error is used by guided weapons in the vicinity of the ground sensor (20) to substantially increase the delivery accuracy of the guided weapons (40).

20 Claims, 4 Drawing Sheets

5,554,994

SELF-SURVEYING RELATIVE GPS (GLOBAL POSITIONING SYSTEM) WEAPON GUIDANCE SYSTEM

BACKGROUND OF THE INVENTION

1. Field of the Invention

This invention relates generally to GPS (Global Positioning System) and, more particularly, to a self-surveying relative GPS weapon guidance system.

2. Discussion of the Related Art

Various weapon guidance systems are in use today. These weapon guidance systems use various techniques to guide weapons to designated three-dimensional points in space. The guidance techniques currently utilize technologies such as GPS, laser, radar and cameras or any combination thereof. In each of the techniques mentioned above, however, there are various accuracy limitations inherent throughout the systems. Thus, if any one of the accuracy limitations in the systems can be reduced, the overall accuracy of an entire guidance system can be improved.

For example, some weapon guidance systems will utilize either a manned or an unmanned aircraft to pass over multiple targets. As the aircraft passes over these targets, the aircraft will identify the location of the targets using radar such as synthetic aperture radar (SAR) or laser radar (LADAR) in combination with a GPS receiver. This aircraft can then provide aim points in GPS coordinates of the various targets to multiple attack weapons. Other weapon guidance systems may eliminate the aircraft and merely use a guided weapon with a terminal seeker. The terminal seeker may consist of the SAR or LADAR in combination with the GPS receiver positioned within the guided weapon itself.

In each of the above scenarios, however, there will be inherent errors associated with the aircraft guidance, GPS location, radar error and attack weapon guidance. By taking the root sum square (RSS) from each of the individual errors, the specific overall error of the guidance system can be calculated. Accordingly, it can be observed that the overall system accuracy will be increased by reducing any one of the inherent errors in the system.

What is needed then is a weapon guidance system having an overall reduced accuracy error so that the attack weapons can be delivered more accurately. This will, in turn, provide a more accurate weapon guidance system which is extremely versatile in many types of situations. Moreover, such a system could eliminate the need for terminal seekers in each guided weapon, thereby reducing cost. It is, therefore, an object of the present invention to provide such a weapon guidance system.

SUMMARY OF THE INVENTION

In accordance with the teachings of the present invention, a self-surveying relative GPS weapon guidance system for increasing the delivery accuracy of guided weapons is disclosed. This is basically achieved by transmitting GPS data from several GPS satellites. The GPS data is received by a ground sensor which determines a GPS error. The GPS error is then transmitted from the ground sensor. Once transmitted, guided weapons in the vicinity of the ground sensor can utilize the GPS error to increase the delivery accuracy of the guided weapons.

In one preferred embodiment, multiple GPS satellites transmit GPS data. A ground sensor including a GPS receiver, a self-surveying computer, a data formatter and a transmitter, receives the GPS data. The self-surveying computer determines a first location of the ground sensor based on the GPS data gathered over time, which is more accurate than a second location. The GPS receiver determines the second location of the ground sensor based on the instantaneous GPS data gathered. The data formatter determines a GPS error between the first and second locations. This GPS error is subsequently transmitted by the transmitter. Multiple guided weapons in the vicinity of the ground sensor utilize the GPS error which substantially increases the delivery accuracy of the guided weapons.

Use of the present invention provides a self-surveying relative GPS weapon guidance system to increase the delivery accuracy of guided weapons. As a result, the aforementioned overall accuracy error associated with current guidance systems will been substantially reduced.

BRIEF DESCRIPTION OF THE DRAWINGS

Still other advantages of the present invention will become apparent to those skilled in the art after reading the following specification and by reference to the following drawings in which.

DETAILED DESCRIPTION OF THE PREFERRED EMBODIMENT

The following description of a self-surveying relative GPS weapon guidance system to increase the delivery accuracy of guided weapons is merely exemplary in nature and is in no way intended to limit the invention or its applications or uses.

Figure 1:
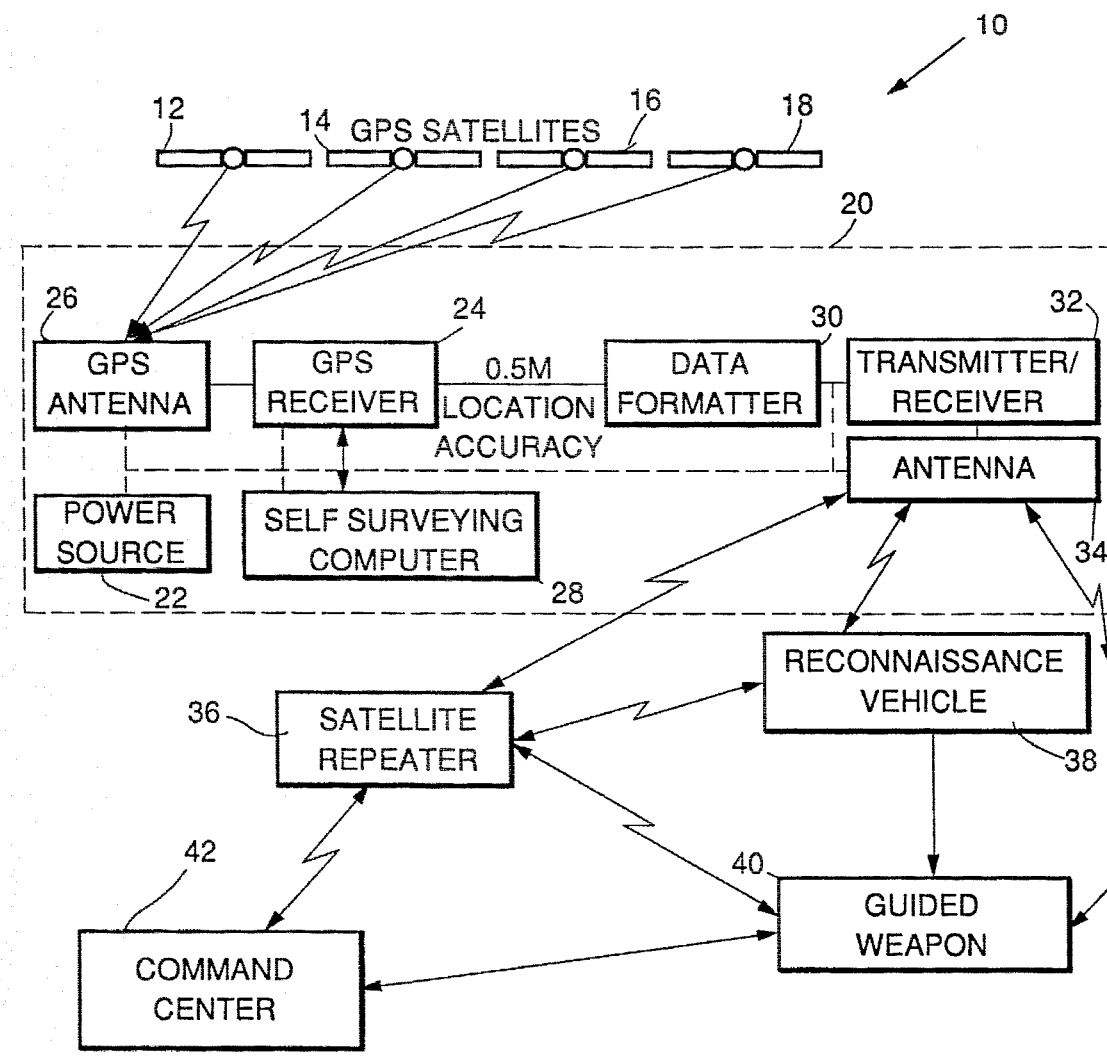
FIG. 1 is a schematic block diagram of one preferred embodiment of the present invention.

Referring to FIG. 1, a schematic block diagram of one preferred embodiment of a self-surveying relative GPS weapon guidance system 10, is shown. The guidance system 10 utilizes at least four GPS satellites 12–18 from a constellation of 21 GPS satellites always orbiting around the earth at very high altitudes. This constellation of 21 GPS satellites was implemented by the United States Department of Defense and can be utilized by both civilian and defense agencies. Each GPS satellite 12–18 transmits a pseudo-random code or GPS data which is received by an unattended ground sensor 20.

The unattended ground sensor 20 is a transportable mobile unit which is internally powered by a power source 22. The power source 22 preferably consists of a bank of lithium batteries which provides approximately six (6) months of power for the ground sensor 20. The ground sensor 20 is preferably positioned in areas that have multiple targets (not shown) by parachute dropping the ground sensor 20 into these areas. The operation of the ground sensor 20 provides GPS error information (as will be discussed later) which is utilized to more accurately locate and track the targets positioned within about a 50 to 100 mile radius of the ground sensor 20.

The unattended ground sensor 20 includes a GPS receiver 24 which receives the pseudo-random code or GPS data from at least the GPS satellites 12–18, via a GPS antenna 26. The GPS receiver 24 is preferably an "all in view" GPS receiver that is capable of receiving and using protected code or P-code (pseudo-random code) from the GPS satellites 12–18. However, other GPS receivers such as a sequential GPS receiver could also be used. The P-code pseudo-random data received by the GPS receiver 24 is only used by military agencies and is not intended for civilian use. The "all in view" GPS receiver 24 is capable of receiving pseudo-random code from between 5 to 10 satellites simultaneously (not shown). Upon receipt of the GPS data, the GPS receiver 24 is capable of determining very quickly a fairly accurate location of the ground sensor 20 in GPS coordinates. The GPS receiver 24 makes this determination based on the distance from the ground sensor 20 to each individual GPS satellite 12–18 used in combination with known satellite ranging techniques utilized by GPS.

The unattended ground sensor 20 further includes a self-surveying computer 28 used to determine a first location or geographical position of the ground sensor 20 which is more accurate than the location which can be determined very quickly by only using the GPS receiver 24. The self-surveying computer 28 allows the ground sensor 20 to become a benchmark location (i.e. very precise reference point) by determining a substantially accurate location of the ground sensor 20. The self-surveying computer 28 determines this precise reference point in GPS coordinates by gathering the GPS data from at least the GPS satellites 12–18, via GPS antenna 26 and GPS receiver 24. As the GPS data is gathered over time, self-surveying algorithms within the self-surveying computer 28 determine the precise location of the ground sensor 20 to within about a two (2.0) meter accuracy after four (4) hours and to within about a 0.5 meter accuracy after seventy-two (72) hours. The self-surveying algorithms were developed and are available through the United States Defense Mapping Agency (DMA). The accuracy and performance of these algorithms is discussed in Geodetic Point Positioning With GPS Carrier Beat Phase Data From The CASA UNO Experiment, Stephen Malys and Major Peter A. Jensen, Defense Mapping Agency, USA, Geophysical Research Letters, Vol. 17, No. 5, pages 651–654, April 1990, herein incorporated by reference.

Once the self-surveying computer 28 determines the first location or the benchmark location of the ground sensor 20, these GPS coordinates are then forwarded to a data formatter 30, via the GPS receiver 24. The GPS receiver 24 then determines a second location or geographical position of the ground sensor 20 based on only the GPS data just received which is also forwarded in GPS coordinates to the data formatter 30. The first and second locations in GPS coordinates include the distance from each GPS satellite 12–18 to the ground sensor 20, known in the art as "pseudo ranges". The data formatter 30 subtracts the pseudo ranges from the first and second locations to determine a GPS error for each pseudo range. The GPS error is the error between the more precise first benchmark location, which is determined by the self-surveying computer 28, over a period of time verses the second location which is determined based only on the GPS data just received by the GPS receiver 24. Once determined, the GPS error is forwarded to a transmitter/receiver 32, also included within the ground sensor 20.

The transmitter/receiver 32 transmits the GPS error, via antenna 34, about once every five (5) to ten (10) minutes. The GPS error is updated by determining an updated first benchmark location using the GPS data gathered over time and a new second location every time the GPS error is transmitted by the transmitter/receiver 32. The transmitter/receiver 32 transmits approximately 40 bits of data for each pseudo range error from each GPS satellite used by the GPS receiver 24. Therefore, if the four GPS satellites 12–18 are used, approximately 160 bits of GPS error data are transmitted by the transmitter/receiver 32 in about 5 to 10 milliseconds. Additionally, it should be noted that since the GPS receiver 24 can be an "all in view" receiver 24, the GPS receiver 24 can monitor up to ten (10) satellites in parallel or simultaneously. Accordingly, the transmitter/receiver 32 may transfer up to 400 bits of data representing the ten (10) pseudo range errors associated with the ten (10) GPS satellites. The transmitter/receiver 32 is also capable of receiving requests, via the antenna 34, as will be discussed in detail later.

Once the GPS error is transmitted by the transmitter/receiver 32, via antenna 34, this GPS error is either received by a satellite repeater 36, a reconnaissance vehicle 38 or a guided weapon 40. If the GPS error is received by the satellite repeater 36, the satellite repeater 36 can forward the GPS error data to the reconnaissance vehicle 38 or the guided weapon 40, which will eliminate any line of sight problems resulting from the ground sensor 20 transmitting the GPS error directly to the reconnaissance vehicle 38 or the guided weapon 40.

Upon receipt of the GPS error from the ground sensor 20 or the satellite repeater 36, the reconnaissance vehicle 38 uses the GPS error to determine more precise aim point locations of multiple targets (not shown). Specifically, as the reconnaissance vehicle 38 passes over multiple targets, the reconnaissance vehicle 38 will identify the location of the targets in GPS coordinates. This location is determined by using a SAR or LADAR sensor in combination with a GPS receiver positioned within the reconnaissance vehicle 38 and the GPS error. Once the precise GPS coordinates of the targets are identified, these coordinates are then forwarded to the guided weapon 40. The guided weapon 40 uses the precise GPS location in combination with its own GPS receiver (not shown) and the GPS error to accurately guide the weapon 40 to the precise target location. In this type of scenario, the guided weapon 40 is a seekerless guided weapon 40 because the GPS location or aim point of the target is already provided to the guided weapon 40 in GPS coordinates, which eliminates the need for the guided weapon 40 to identify the target on its own.

If the guided weapon 40 receives the GPS error directly from the ground sensor 20 or the satellite repeater 36 without precise target weapon information, the guided weapon 40 will require a terminal seeker such as a SAR or LADAR sensor. The guided weapon 40 will use the SAR or LADAR sensor in combination with its own GPS receiver and the GPS error to more accurately identify the target location and guide the weapon 40 to the target identified by the SAR or LADAR sensor.

The satellite repeater 36, the reconnaissance vehicle 38 and the guided weapon 40 can also be configured to request the GPS error from the ground sensor 20. This request would be received by the transmitter/receiver 32, via the antenna 34. Utilizing such a configuration would eliminate the need for the transmitter/receiver 32 to transmit the GPS error every five (5) to ten (10) minutes, which may increase the life of the power source 22. Additionally, one skilled in the art would also recognize that since the transmitter/receiver 32 only transmits short bursts of data every five (5) to ten (10) minutes or upon request, the ground sensor 20 operates in a covert manner. Operating in this manner makes it extremely difficult to track or locate the ground sensor 20.

The satellite repeater 36 can also transmit the GPS error to a command center 42. The command center 42 is preferably a ground based command center 42 which is located remotely from the ground sensor 20. The command center 42 is preferably utilized when there are multiple ground sensors 20 which are operating simultaneously. The satellite repeater 36 will receive the GPS errors from each of the ground sensors 20 and forward each of these GPS errors to the command center 42. The command center 42 sorts the GPS errors from the highest to lowest errors to determine the median GPS error. This median GPS error is transmitted by the command center 42 back to the satellite repeater 36 and subsequently to either multiple reconnaissance vehicles 38 or to multiple guided weapons 40. By use of the median GPS error, erroneous GPS error data which results from faulty ground sensors 20 or ground sensors 20 which have been discovered and subsequently moved are eliminated.

Figure 2:
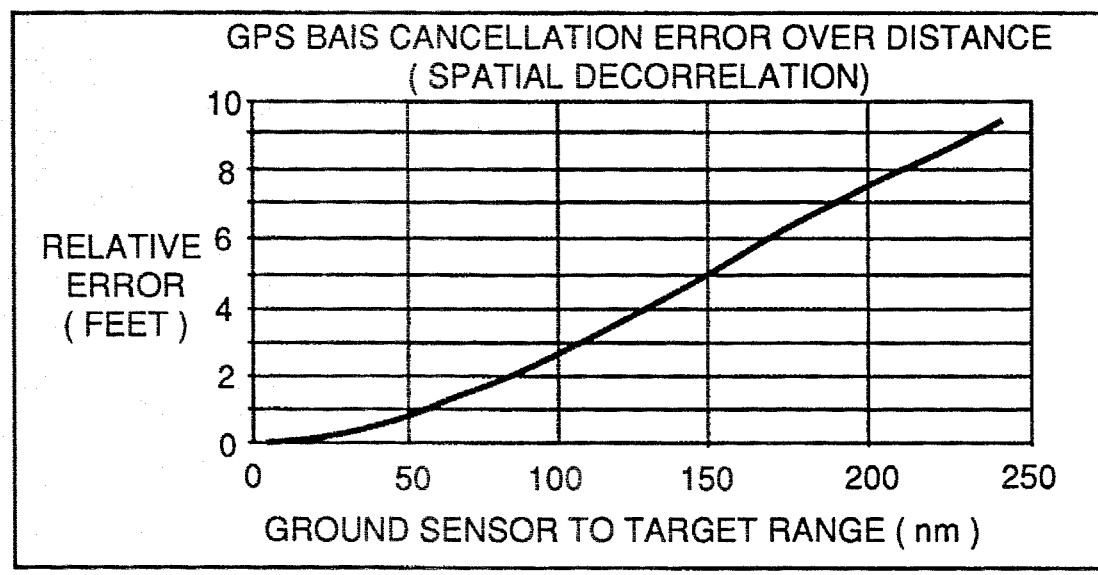
FIG. 2 is a graph of GPS error over distance.
Figure 3:
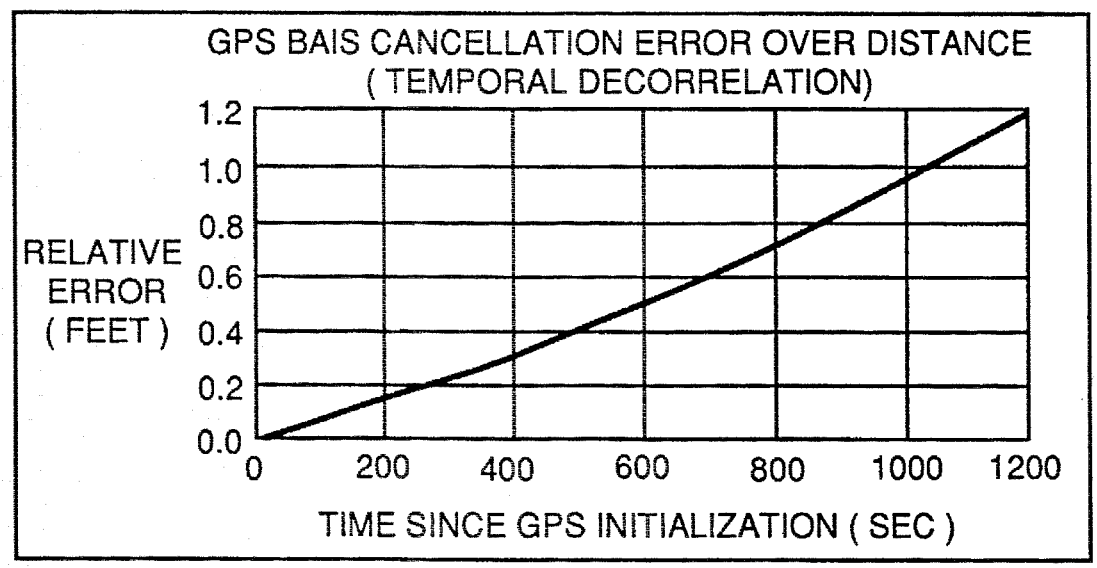
FIG. 3 is a graph of GPS error over time.

Referring to FIGS. 2 and 3, FIG. 2 displays a graph of the GPS error over distance. This graph shows the relative error in feet versus the unattended ground sensor 20 range in nautical miles from the target. For example, if the ground sensor 20 is approximately 150 nautical miles from a target, the relative error in GPS coordinates will be approximately five (5) feet. In FIG. 3, the GPS error over time, is shown. This graph shows the relative error in feet versus when the last GPS error signal was received or used in seconds. For example, if the ground sensor 20 transmits a GPS error signal at 12:00 a.m. and the reconnaissance vehicle 38 uses this GPS error at approximately 12:15 a.m. (approximately 900 seconds), then the relative error would be approximately 0.8 feet, based on the time lag from calculating the GPS error to actually using this GPS error. Therefore, the more frequently the GPS error is transmitted, the more accurate the entire guidance system 10 will be.

Figure 4:
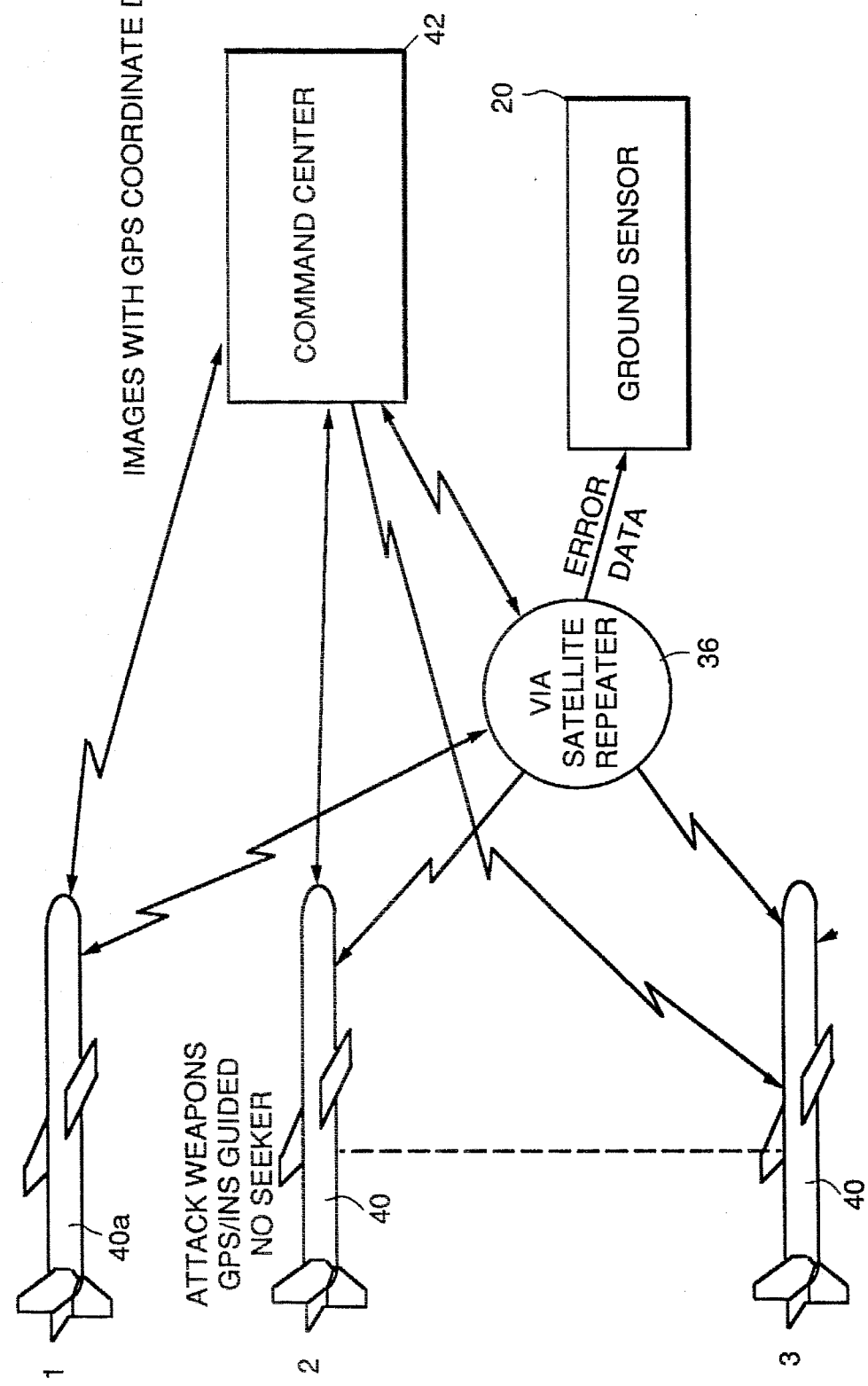
FIG. 4 is a block diagram of one preferred embodiment of the present invention implemented in combination with multiple guided weapons.

Referring to FIG. 4, the self-surveying relative GPS weapon guidance system 10 is shown implemented in combination with multiple guided weapons 40. In this configuration, the guided weapon 40A is equipped with a terminal seeker consisting of a LADAR sensor which is essentially a laser radar camera that can provide three-dimensional target information as the weapon 40A passes over multiple targets. The guided weapon 40A uses the LADAR sensor in combination with its own GPS receiver, as well as the GPS error provided from the ground sensor 20, via the satellite repeater 36, to provide more precise target locations in GPS coordinates. This target information in GPS coordinates can then either be forwarded directly, or via the satellite repeater 36, to the other guided weapons 40 or the command center 42. The command center 42 forwards the GPS target data either directly or via the satellite repeater 36 to the additional guided weapons 40. This eliminates the need for the additional guided weapons 40 to contain terminal seekers which are relatively expensive.

In this configuration, the overall accuracy of the entire guidance system 10 using a seekerless guided weapon 40 is approximately 1.75 meters. This accuracy is determined based on a 0.5 meter error for the precise location of the ground sensor 20; a 1.25 meter error assuming a 150 nautical mile offset between the target and the ground sensor 20; a 1.0 meter error for the missile guidance system; and a GPS time lapse error which will be assumed to be negligible. Taking the root sum square of these errors thus provides the overall error of the weapon guidance system 10 of about 1.75 meters.

Figure 5:
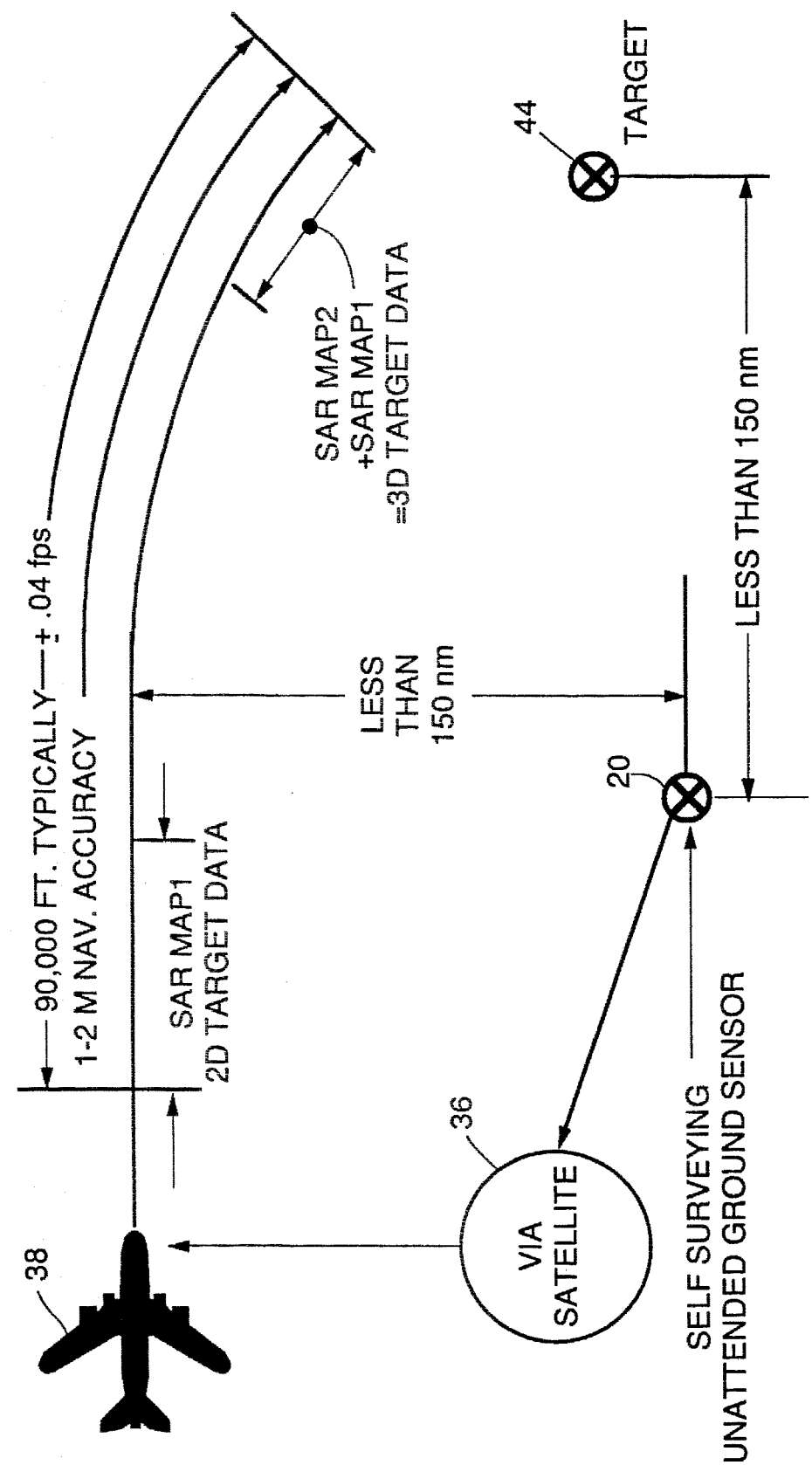
FIG. 5 is a block diagram of one preferred embodiment of the present invention implemented in combination with an aircraft.

In FIG. 5, the self-surveying GPS weapon guidance system 10 is shown implemented in combination with a reconnaissance vehicle 38. The reconnaissance vehicle 38, which can either be a manned or an unmanned vehicle 38 is shown using a SAR sensor to identify a target 44. The reconnaissance vehicle 38 uses its own GPS receiver plus the GPS error received by the ground sensor 20, via the satellite repeater 36 to determine its precise location as it passes over the target 44. The reconnaissance vehicle 38 first determines a SAR Map 1 having two-dimensional target data and a SAR Map 2 also in two-dimensional target data using known SAR mapping techniques. The SAR Map 1 and SAR Map 2 are then combined with the altitude of the target 44 which is determined by a known doppler-cone technique to provide three-dimensional target location data of the target 44. Using these known SAR mapping techniques, the reconnaissance vehicle 38 will typically first locate the target 44 within a range of 90,000 feet. Once located, the reconnaissance vehicle 38 will follow a path as shown in FIG. 5, making approximately a 30° change in course to gather the data needed to identify the location of the target. This three-dimensional target location is used in combination with the known precise location of the reconnaissance vehicle 38 to determine the precise target 44 location in GPS coordinates.

By implementing the guidance system 10 in combination with the reconnaissance vehicle 38 as shown in FIG. 5, the overall error of delivering a guided weapon 40 to the target 44 will be approximately 2.61 meters. This accuracy is determined based on a 0.5 meter error for the precise location of the ground sensor 20; a 1.25 meter error from the 150 nautical mile displacement error of the ground sensor 20; a 1.0 meter error for the missile guidance system; a 2.0 meter error for the reconnaissance vehicle 38 guidance system; and a GPS time lapse error which will be assumed to be negligible. Taking the root sum square of these errors thus provides the overall error of the weapon guidance system 10 of about 2.61 meters.

The foregoing discussion discloses and describes merely exemplary embodiments of the present invention. One skilled in the art would readily realize from such a discussion, and from the accompanying drawings and claims, that various changes, modifications and variations can be made therein within departing from the spirit and scope of the invention as defined by the following claims.

What is claimed is:

1. A self-surveying relative GPS (Global Positioning System) weapon guidance system, said system comprising:

a plurality of GPS satellites, said GPS satellites each operable to transmit GPS data;

a transportable unattended ground sensor, said transportable unattended ground sensor including GPS receiver means for receiving said GPS data and determining a second location of the transportable unattended ground sensor, self-surveying means for determining a first benchmark location of the transportable unattended ground sensor, said first benchmark location being more accurate than the second location, error means for determining GPS error between the first benchmark location and the second location, and transmitter means for transmitting the GPS error; and a guided weapon, said guided weapon operable to utilize the GPS error to substantially increase the delivery accuracy of the guided weapon.

2. The self-surveying relative GPS weapon guidance system as defined in claim 1 wherein the plurality of GPS satellites includes at least four (4) GPS satellites.

3. The self-surveying relative GPS weapon guidance system as defined in claim 1 wherein the GPS receiver means includes a GPS antenna and a GPS receiver, said GPS receiver is an all-in-view protected code (P-Code) GPS receiver.

4. The self-surveying relative GPS weapon guidance system as defined in claim 1 wherein the self-surveying means includes a self-surveying computer which determines the first benchmark location of the transportable unattended ground sensor, said first benchmark location is more accurate than the second location after gathering the GPS data for at least four (4) hours.

5. The self-surveying relative GPS weapon guidance system as defined in claim 4 wherein the self-surveying computer determines the first benchmark location to within about a 2.0 meter accuracy after about four (4) hours and to within about a 0.5 meter accuracy after about seventy-two (72) hours.

6. The self-surveying relative GPS weapon guidance system as defined in claim 1 wherein said error means includes a data formatter for subtracting second location data from first location data to determine the GPS error between the first and the second locations.

7. The self-surveying relative GPS weapon guidance system as defined in claim 1 wherein the transmitter means transmits the GPS error about every five (5) to ten (10) minutes.

8. The self-surveying relative GPS weapon guidance system as defined in claim 1 further comprising a plurality of guided weapons.

9. The self-surveying relative GPS weapon guidance system as defined in claim 8 further comprising a plurality of transportable unattended ground sensors for determining a plurality of GPS errors.

10. The self-surveying relative GPS weapon guidance system as defined in claim 9 further comprising repeater means for receiving GPS errors from the transmitter means and relaying the GPS errors to the guided weapons.

11. The self-surveying relative GPS weapon guidance system as defined in claim 10 further comprising a command center for gathering the plurality of GPS errors from the repeater means, said command center determining the median GPS error from the plurality of GPS errors and transmitting the median GPS error to the repeater means, said repeater means transmits the median GPS error to the plurality of guided weapons.

12. A self-surveying relative GPS (Global Positioning System) weapon guidance system, said system comprising:

at least four (4) GPS satellites, said GPS satellites each operable to transmit GPS data;

a plurality of transportable unattended ground sensors, said plurality of transportable unattended ground sensors each including a GPS receiver for receiving said GPS data and determining a second location of the transportable unattended ground sensor, a self-surveying computer for determining a first benchmark location of the transportable unattended ground sensor over time, said first benchmark location being more accurate than the second location, error means for determining a GPS error between the first benchmark location and the second location, and transmitter means for transmitting the GPS errors;

a command center, said command center operable to receive the GPS errors from the plurality of transportable unattended ground sensors and determine a median GPS error from the GPS errors; and a plurality of guided weapons, said guided weapons operable to utilize the median GPS error to substantially increase the delivery accuracies of the guided weapons.

13. The self-surveying relative GPS weapon guidance system as defined in claim 12 wherein the GPS receiver is an all-in-view protected code (P-code) GPS receiver capable of receiving GPS data from up to ten (10) GPS satellites simultaneously.

14. The self-surveying relative GPS weapon guidance system as defined in claim 12 wherein the self-surveying computer determines the first benchmark location to within about a 2.0 meter accuracy after about four (4) hours and to within about a 0.5 meter accuracy after about seventy-two (72) hours.

15. The self-surveying relative GPS weapon guidance system as defined in claim 12 wherein said error means includes a data formatter for subtracting second location data from first location data to determine the GPS error between the first and second locations.

16. The self-surveying relative GPS weapon guidance system as defined in claim 12 further comprising repeater means for receiving the GPS errors from the transmitter means and relaying the GPS errors to the command center and for relaying the median GPS error from the command center to the guided weapons.

17. The self-surveying relative GPS weapon guidance system as defined in claim 16 further comprising at least one (1) reconnaissance vehicle, said reconnaissance vehicle operable to receive the median GPS error from the repeater means and identify the location of multiple targets in GPS coordinates.

18. A method for accurately guiding a guided weapon, said method comprising the steps of:

positioning a transportable unattended ground sensor within an area of multiple targets having an initially unknown benchmark location;

determining a first benchmark location of the transportable unattended ground sensor from a self-surveying computer within the transportable unattended ground sensor, said first benchmark location being more accurate than a second location;

determining the second location of the transportable unattended ground sensor from a GPS (Global Positioning System) receiver within the ground sensor;

determining a GPS error between the first benchmark location and the second location;

transmitting the GPS error from the transportable unattended ground sensor; and utilizing the GPS error to more accurately guide the guided weapon.

19. The method as defined in claim 18 wherein the step of positioning the transportable unattended ground sensor further includes the step of parachute dropping the transportable unattended ground sensor within the area of multiple targets.

20. The method as defined in claim 18 wherein the step of determining the first benchmark location of the transportable unattended ground sensor from the self-surveying computer further includes the steps of determining the first benchmark location to within about a 2.0 meter accuracy after about four (4) hours and to within about a 0.5 meter accuracy after about seventy-two (72) hours.

* * * * *